United States Patent [19]  
Taylor

[11] 4,016,760  
[45] Apr. 12, 1977

[54] DIFFERENTIAL FLOWMETER  
[75] Inventor: Thomas D. Taylor, Roanoke, Va.  
[73] Assignee: Graham-White Manufacturing Co., Salem, Va.  
[22] Filed: Dec. 17, 1975  
[21] Appl. No.: 641,825  
[52] U.S. Cl. .............................. 73/205 R; 73/412; 73/416; 73/392  
[51] Int. Cl.² .......................................... G01F 1/34  
[58] Field of Search ............... 73/211, 205 R, 412, 73/392, 416, 418; 116/129 P, 129 L

[56] References Cited  
UNITED STATES PATENTS

| | | | |
|---|---|---|---|
| 1,172,087 | 2/1916 | Westcott | 73/211 |
| 1,437,176 | 11/1922 | Harris | 73/392 |
| 2,071,191 | 2/1937 | Wotring | 73/412 |
| 2,112,880 | 4/1938 | Brewer | 116/129 P |
| 2,243,398 | 5/1941 | Sewell | 73/412 |
| 3,176,515 | 4/1965 | Huston | 73/416 |
| 3,207,179 | 9/1965 | Klagues | 73/392 |

Primary Examiner—James J. Gill  
Assistant Examiner—Anthony V. Ciarlante  
Attorney, Agent, or Firm—Wilmer Mechlin

[57] ABSTRACT

Gauge having a Bourdon tube sealed in a pressure chamber and the tube and chamber connected to a fluid line, respectively upstream and downstream of a restriction therein, for indicating through an indicator operatively connected to the free end of the tube variations in the flow rate in the line by the effect on the tube of pressure differentials across the restriction. An orifice and an equalizing valve in the upstream connection protect the tube against sudden overpressures and limit the maximum pressure differential thereon.

7 Claims, 4 Drawing Figures

DIFFERENTIAL FLOWMETER

BACKGROUND OF THE INVENTION

As usually simpler, pressure measuring devices are widely used in lieu of direct volumetric measurement for translating pressure differentials across a restriction in a fluid line into flow rates. Since the flow rate varies as the square root of the pressure differential, for the flow rate to be directly readable on a scale, either the drive mechanism for the indicator or the scale itself must be adapted to extract the square roots of the pressure differentials. However, a uniform linear scale giving direct readings or pressure differentials, will suffice to indicate variations in the flow rate. In a type of differential flowmeter disclosed in Wotring U.S. Pat. No. 2,071,191, a Bourdon tube connected to a fluid line upstream of a restriction therein, is contained with a dial and indicating mechanism in a sealed casing permanently partly filled with an incompressible transparent fluid and the downstream pressure is applied externally to the tube through the fluid from a partially inflated sack or bladder immersed therein. The present invention is particularly concerned with an improvement on the Wotring type of differential flowmeter in which both the permanent fluid filling and the inflated sack are dispensed with.

SUMMARY OF THE INVENTION

The primary object of the present invention is to provide an improved differential flowmeter or pressure measuring device wherein an expansible element is sealed in a pressure chamber, the element and chamber are connected to different sources of fluid pressure and fluid in the chamber from its source acts directly on the exterior of the element.

Another object of the invention is to provide a differential flowmeter wherein a Bourdon tube and indicating mechanism are sealed in a pressure chamber within a casing, pressure differentials across a restriction in a fluid line are applied directly to the tube by fluid from the line and responsive movements of the tube are transmitted by the mechanism magnetically to an indicator in a housing outside the casing.

An additional object of the invention is to provide a differential flowmeter wherein pressure differentials across a restriction in a fluid line are applied by line fluid directly to a Bourdon tube sealed in a pressure chamber and an orifice and equalizing valve in an upstream connection to the tube's interior protect the tube from sudden overpressures and excessive pressure differentials.

Other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 1:
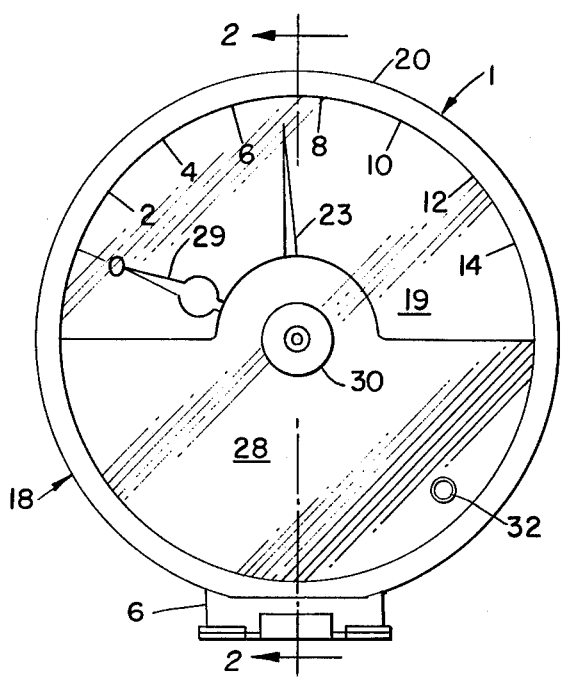
FIG. 1 is a front elevational view of a preferred embodiment of the improved differential flowmeter of the present invention.
Figure 2:
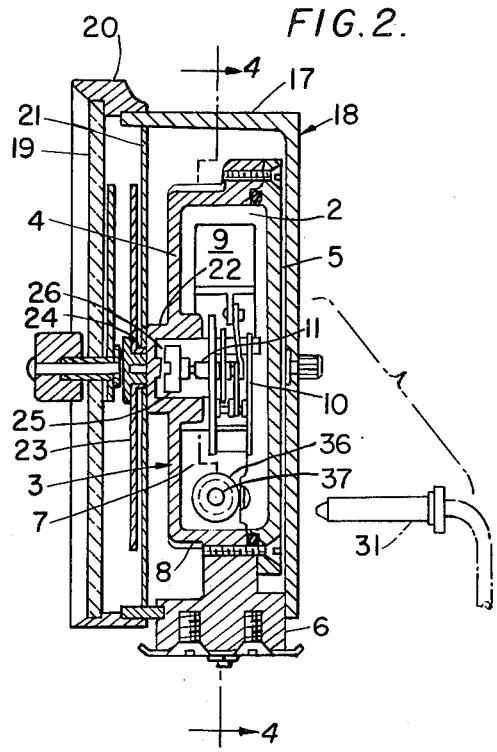
FIG. 2 is a view of the flowmeter of FIG. 1 taken along lines 2—2 of that figure but showing in side elevation the elements in the pressure chamber and a warning light retracted from the housing.
Figure 3:
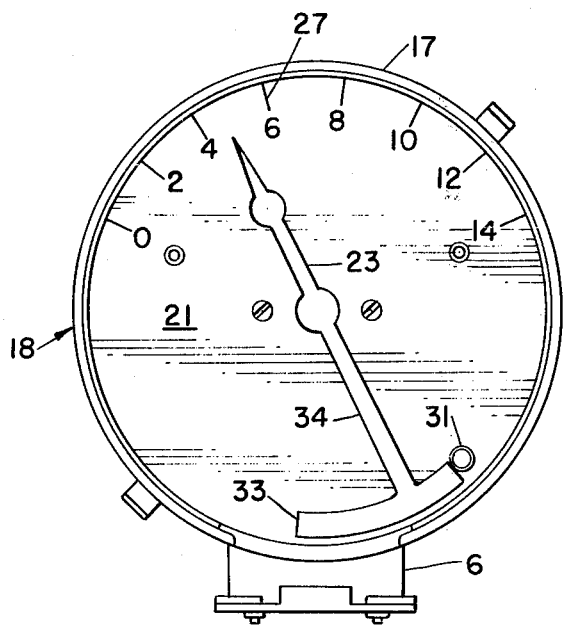
FIG. 3 is a front elevational view of the flowmeter of FIG. 1 with the lens and retaining ring removed.
Figure 4:
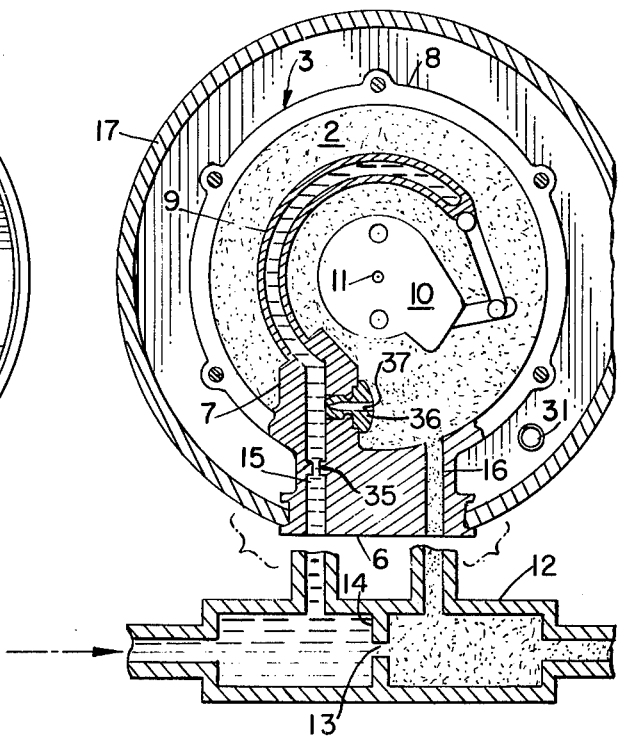
FIG. 4 is a vertical sectional view taken along lines 4—4 of FIG. 2, with part of the housing broken away and showing somewhat schematically the connections to a fluid line containing a restriction.

Referring now in detail to the drawings in which like reference characters designate like parts, the improved differential flowmeter of the present invention, while applicable generally for gauging pressure differentials in indicating or measuring fluid flow or otherwise, is particularly designed as a gauge for indicating the flow rate of gases, such as air in the compressed air system of a diesel locomotive.

As the gauge or flow indicator of the illustrated preferred embodiment, the improved differential flowmeter, designated as 1, is comprised of a suitably cylindrical pressure chamber 2 in a generally cylindrical casing 3 having a conveniently cast, open-backed body normally closed and sealed fluid-tight by a suitably gasketed removable back or cover plate 5 and having at the bottom a depending or downwardly projecting base 6. Sealed in the pressure chamber 2 and anchored at its lower or bottom end in an abutment 7 conveniently integral with and instanding from a side 8 of the body 4, is a Bourdon tube or like element 9 expansible in response to internal fluid pressure. Also suitably sealed in the pressure chamber 2 and linked or drivably or operatively connected to the free, upper or outer end of the tube 9, is a drive train or mechanism 10 for translating or converting bending, flexing or other expanding and contracting movements of the initially circularly curved Bourdon tube or other pressure-responsive element into corresponding rotary movement of a drive or indicator or pointer shaft 11 journalled in and extending axially of the pressure chamber.

The pressure chamber 2 and open anchored end of the Bourdon tube 9 are separately fluid-connected to a fluid line 12, respectively usually upstream and downstream of an orifice 13 in an orifice plate 14 or other restriction in the line, the orifice or restriction preferably being of a fixed cross-sectional area providing a predetermined maximum pressure differential at the maximum rate of flow expected in the line. Desirably, the upstream and downstream connections or piping 15 and 16, respectively, are made through a mounting bracket (not shown), such as disclosed in Frantz U.S. Pat. No. 3,603,154, issued Sept. 7, 1971, permanently connected to the line 12 and releasably clamping the base 6, for enabling the gauge 1 to be disconnected free of and without affecting the pressure in the line.

In the preferred gauge 1, the casing 3 is mounted or enclosed in and the base 6 extends downwardly through a side wall 17 of a housing or outer casing 18 closed or covered at the front by a lens 19 mounted in a retainer ring 20 clipped or otherwise removably secured to the housing. Between the inner casing 3 and the lens, the housing 18 contains a dial 21 suitably mounted on a forwardly projecting central or axial boss 22 on the front of the inner casing and, in front of the dial, a pointer or indicator 23 pivotally mounted on the boss. To avoid the impediment to movement of the otherwise necessary shaft bushing, the pointer 23 preferably is not directly connected to the shaft 11 and instead carries or mounts axially a driven magnet 24 for magnetic turning by a drive magnet 25 fixed to the end of the shaft within the pressure chamber chamber 2 and turning in a socket 26 in the boss 22, the body 4, for such a drive, being non-magnetic.

Limited in its swing in response to expansion and contraction or flexing of the tube 9 under the pressure differentials across the restriction 13, the pointer 23 of the illustrated embodiment is positioned to indicate flow rates in the fluid line 12 on a scale 27 on the upper part of the dial 21 and the dial's lower part is covered, conveniently by a masking card or plate 28 on the inside of the lens 19. In applications, such as to a chemical process in which the rate of flow through the connected or tapped line 12 is critical and direct reading of the rate important, the scale 27 can be a non-uniform square root scale calibrated to extract the flow rates from the pressure differentials. However, where, as in a line supplying compressed air to a locomotive's air brakes, an indication of relative flow rates is adequate, a uniform scale, such as illustrated, giving direct readings of the pressure differentials, usually will suffice since the differential varies directly with the flow rate.

Regardless of how the scale 27 is calibrated, a usually desirable addition to the gauge 1 is a movable reference pointer 29 conveniently mounted on the inside of the lens 19 and settable manually therethrough by a knob 30. Another, for visually indicating to an engineman or other operator when the flow through the line 12 reaches an abnormal or dangerous rate, is a warning light 31 in the gauge exposed at that point. The preferred warning light 31 is a constantly-on red light emitting diode inserted from the back into the housing 18 clear of the casing 3 and projecting into a lower part of the dial 21. Observable or exposable through an aligned opening 32 in the masking card 28, the light 31 is obscured or covered, until the pointer 23 reaches the point of abnormal flow on the scale 27, by a suitably arcuate cover or lateral extension on the pointer's tail 34.

A very important feature of the preferred gauge 1 is its provision for protecting the Bourdon tube 9 from damage both from sudden overpressures or pressure surges in the line 12 upstream of the restriction 13 and from excessive differences in the pressures in the tube and the pressure chamber 2. Both protections are afforded by means in the casing 3, that against sudden overpressures a restricted orifice 35 in the upstream connection 15 between the tube 9 and the line 12 and that against excessive pressure differentials an equalizing or relief valve 36 between the upstream connection and the pressure chamber 2. The preferred equalizing valve 36 is a rubber or like elastomeric plug seated in the abutment 7 below or in advance of the tube 9 and having a normally closed axial bore 37 openable at a predetermined pressure difference for connecting or opening the upstream connection 15 to the pressure chamber 2 and temporarily equalizing the pressures therein.

From the above detailed description it will be apparent that there has been provided an improved differential flowmeter relying for operation by pressure differentials across a restriction in a fluid line on direct imposition by line fluid upon an expansible element of pressures in the line upstream and downstream of the restriction. It should be understood that the described and disclosed embodiment is merely exemplary of the invention and that all modifications are intended to be included that do not depart from the spirit of the invention and the scope of the appended claims.

Having now described my invention, I claim:

1. A differential flowmeter comprising a fluid-tight casing, a pressure chamber contained in said casing, an element sealed in said chamber and expansible and contractible in response to differentials in internal and external pressures thereon, said element internally and said chamber being separately connected to a fluid line on opposite sides of a restriction therein for receiving line fluid therefrom and therethrough applying directly to said element different pressures in said line upstream and downstream of said restriction, and an equalizing valve in said pressure chamber between said chamber and the upstream connection of the pressure responsive element to the fluid line for limiting the differential pressures on the element to a predetermined maximum.

2. A flowmeter according to claim 1, wherein the pressure responsive element is a Bourdon tube, and said tube is connected to the fluid line upstream of the restriction therein.

3. A flowmeter according to claim 2, including a restricted orifice in the upstream connection of the tube to the fluid line for protecting the tube from sudden overpressures in the line.

4. A flowmeter according to claim 2, including indicating mechanism in the pressure chamber and drivably connected to a free end of the tube, a housing enclosing the casing, and indicator means in said housing outside the casing and driven by said drive mechanism.

5. A flowmeter according to claim 4, wherein the indicator means includes a dial and an indicator driven by the mechanism for indicating on a scale on the dial flow rates in the fluid line.

6. A flowmeter according to claim 5, including drive and driven magnets respectively on the drive mechanism and the indicator and coacting through an intervening wall of the casing for drivably connecting the mechanism and indicator.

7. A flowmeter according to claim 6, including a warning light exposed on the dial above a predetermined point on the scale and covered therebelow by means on the indicator for visually indicating an abnormal flow rate in the fluid line.

* * * * *